US010578993B1

(12) United States Patent
Masuda

(10) Patent No.: US 10,578,993 B1
(45) Date of Patent: Mar. 3, 2020

(54) OPTICAL UNIFORMIZATION IN IMAGE FORMING APPARATUS

(71) Applicant: TOSHIBA TEC KABUSHIKI KAISHA, Tokyo (JP)

(72) Inventor: Yoshihisa Masuda, Kanagawa (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/267,655

(22) Filed: Feb. 5, 2019

(51) Int. Cl.
*G03G 15/04* (2006.01)
*G02B 26/12* (2006.01)
*G03G 15/043* (2006.01)
*G03G 15/01* (2006.01)

(52) U.S. Cl.
CPC ....... *G03G 15/0435* (2013.01); *G02B 26/123* (2013.01); *G03G 15/0131* (2013.01); *G03G 15/04072* (2013.01); *G03G 2215/0404* (2013.01)

(58) Field of Classification Search
CPC ............. G03G 15/011; G03G 15/0131; G03G 15/04036; G03G 15/04072; G03G 15/0435; G03G 2215/0404; G02B 26/123; G02B 26/125
See application file for complete search history.

(56) References Cited

U.S. PATENT DOCUMENTS

| | | | |
|---|---|---|---|
| 6,262,753 B1* | 7/2001 | Chee | G03G 15/0194 347/115 |
| 7,889,408 B2 | 2/2011 | Tomioka | |
| 2005/0174418 A1* | 8/2005 | Sakaue | G03G 15/011 347/112 |
| 2006/0290773 A1* | 12/2006 | Fukutomi | G03G 15/011 347/238 |
| 2007/0258121 A1* | 11/2007 | Kim | G02B 26/123 359/204.1 |
| 2010/0309516 A1* | 12/2010 | Naito | G02B 26/123 358/1.15 |
| 2011/0002025 A1* | 1/2011 | Tokita | G02B 26/123 359/204.3 |
| 2012/0182372 A1* | 7/2012 | Kodo | G02B 26/123 347/224 |
| 2013/0070323 A1* | 3/2013 | Tokita | G03G 15/0435 359/204.3 |
| 2014/0204165 A1* | 7/2014 | Yamawaki | G03G 15/0435 347/118 |
| 2016/0124219 A1* | 5/2016 | Kurokawa | G03G 15/0435 399/51 |
| 2017/0255123 A1* | 9/2017 | Shumiya | G03G 15/011 |

* cited by examiner

*Primary Examiner* — Sophia S Chen
(74) *Attorney, Agent, or Firm* — Kim & Stewart LLP

(57) ABSTRACT

An image forming apparatus includes first and second photoconductive drums, and a laser scanning unit including a plurality of optical elements configured to direct a first scanning beam to the first photoconductive drum from a first side of, and at a first incidence angle with respect to, a first line passing through a center of the first photoconductive drum and a second scanning beam to the second photoconductive drum from a second side of, and at a second incidence angle with respect to, a second line passing through a center of the second photoconductive drum. Magnitudes of the first and second incidence angles are substantially the same, and a second side of the first line and a first side of the second line are each between the first side of the first line and the second side of the second line.

17 Claims, 4 Drawing Sheets

OPTICAL UNIFORMIZATION IN IMAGE FORMING APPARATUS

FIELD

Embodiments described herein relate generally to an image forming apparatus.

BACKGROUND

An image forming apparatus includes a laser scanning unit which exposes a photoconductive drum. A compact image forming apparatus is in demand.

DETAILED DESCRIPTION

In general, according to one embodiment, an image forming apparatus includes a first photoconductive drum, a second photoconductive drum having a center aligned with a center of the first photoconductive drum along a first direction, and a laser scanning unit including a plurality of optical elements. The plurality of optical elements is configured to direct a first scanning beam to the first photoconductive drum from a first side of, and at a first incidence angle with respect to, a first line passing through the center of the first photoconductive drum and a first incidence position of the first scanning beam on the first photoconductive drum in a second direction crossing the first direction. The plurality of optical elements is configured to direct a second scanning beam to the second photoconductive drum from a second side of, and at a second incidence angle with respect to, a second line passing through the center of the second photoconductive drum and a second incidence position of the second scanning beam on the second photoconductive drum in the second direction. The magnitudes of the first incidence angle and the second incidence angle are substantially the same, and a second side of the first line, which is opposite to the first side of the first line, and a first side of the second line, which is opposite to the second side of the second line, are each between the first side of the first line and the second side of the second line.

Figure 1:
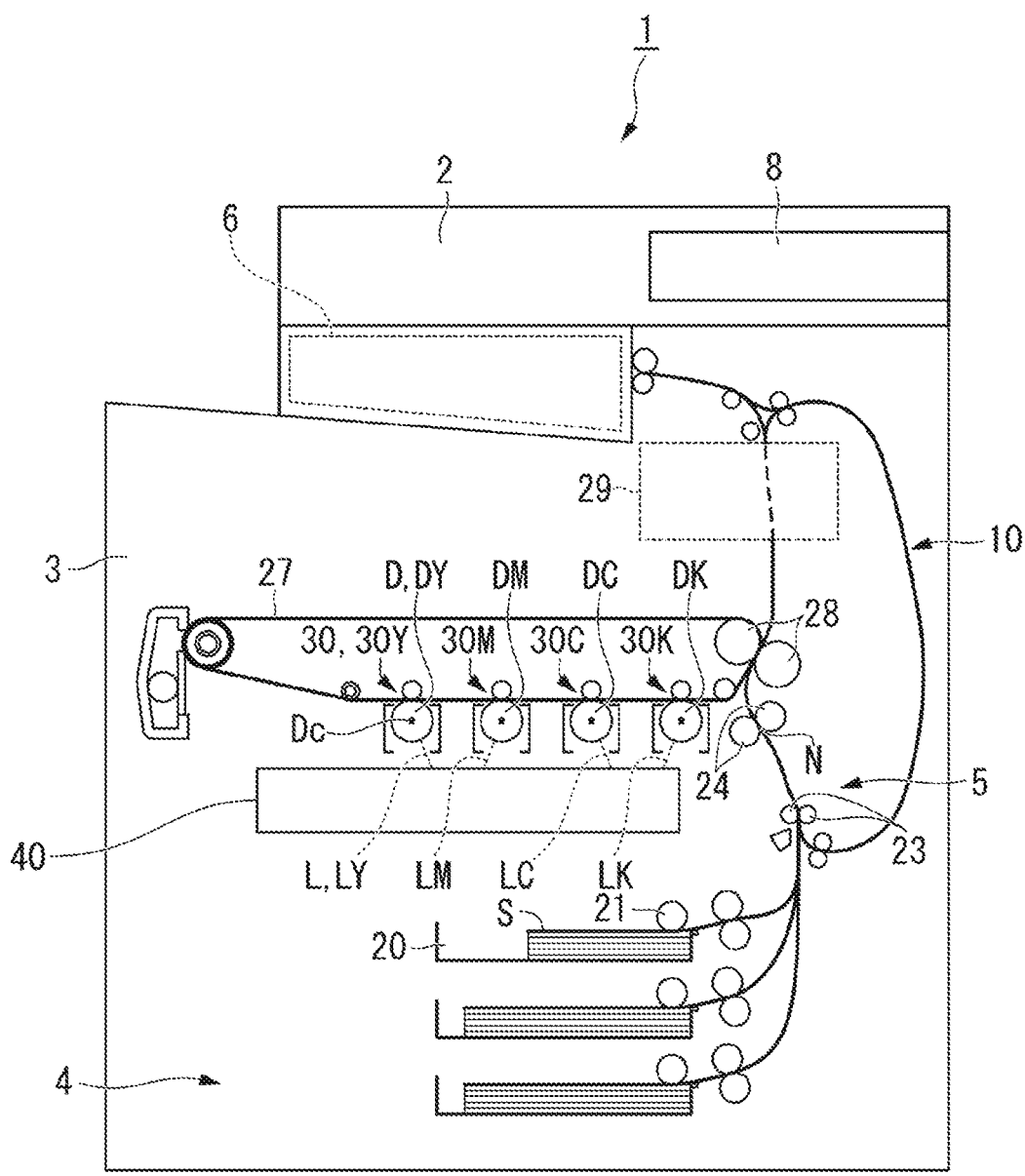
FIG. 1 is a diagram schematically illustrating a configuration of an image forming apparatus according to an embodiment.

Hereinafter, an image forming apparatus according to an embodiment will be described with reference to the drawings. FIG. 1 is a diagram schematically illustrating a configuration of an image forming apparatus according to an embodiment. X direction, Y direction, and Z direction are defined as follows. X direction is a direction of a center axis of a photoconductive drum D. +X direction is a depth direction (with respect to the paper surface of FIG. 1) toward an image forming apparatus 1. −X direction is an opposite direction to +X direction. Y direction is a direction in which a plurality of photoconductive drums DY, DM, DC, and DK are aligned. +Y direction (first direction) is a direction heading from the first photoconductive drum DY toward the fourth photoconductive drum DK. −Y direction (second direction) is an opposite direction to +Y direction. Z direction is a direction in which a laser scanning unit 40 and the photoconductive drum D are aligned. +Z direction (third direction) is a direction heading from the laser scanning unit 40 toward the photoconductive drum D. −Z direction (fourth direction) is an opposite direction to +Z direction.

As illustrated in FIG. 1, the image forming apparatus 1 includes a scanner unit 2, a printer unit 3, a sheet feeding unit 4, a conveyance unit 5, a control panel 8, and a control unit 6.

The scanner unit 2 reads image information of a copying target based on brightness and darkness of light reflected therefrom, and generates an image signal. The scanner unit 2 outputs the generated image signal to the printer unit 3.

The printer unit 3 forms an output image (hereinbelow, referred to as a toner image) with a developer containing toner based on the image signal received from the scanner unit 2 or the image signal received from the outside. The printer unit 3 transfers the toner image to a surface of one of sheets S conveyed from the sheet feeding unit 4. The printer unit 3 applies heat and pressure to the toner image on the surface of the sheet S to fix the toner image to the sheet S.

The sheet feeding unit 4 feeds sheets S one by one to the conveyance unit 5 in synchronization with timing when the printer unit 3 forms the toner image. The sheet feeding unit 4 includes a sheet cassette 20 and a pickup roller 21.

The sheet cassette 20 stores the sheets S of predetermined size and type.

The pickup roller 21 takes out the sheets S one by one from the sheet cassette 20. The pickup roller 21 feeds the taken-out sheet S to the conveyance unit 5.

The conveyance unit 5 conveys the sheet S fed from the sheet feeding unit 4 to the printer unit 3. The conveyance unit 5 includes a conveyance roller 23 and a resist roller 24.

The conveyance roller 23 conveys the sheet S fed from the pickup roller 21 to the resist roller 24. The conveyance roller 23 butts a leading end in the conveyance direction of the sheet S to a nip portion N of the resist roller 24. The conveyance roller 23 regulates the position of the leading end of the sheet S in the conveyance direction by warping the sheet S.

The resist roller 24 aligns the leading end of the sheet S to the nip portion N. The resist roller 24 conveys the sheet S in synchronization with timing when the printer unit 3 transfers the toner image to the sheet S.

The control panel 8 is a part of an input unit through which an operator inputs information to operate the image forming apparatus 1. The control panel 8 includes a touch panel and various types of hard keys.

The control unit 6 performs control of the respective units of the image forming apparatus 1.

The configuration of the printer unit 3 will be described below.

The printer unit 3 includes an image forming unit 30, the laser scanning unit 40, an intermediate transfer belt 27, a transfer unit 28, a fixing device 29, and a reverse unit 10.

The image forming unit 30 includes the photoconductive drum D. The image forming unit 30 forms a toner image on the photoconductive drum D according to an image signal received from the scanner unit 2 or the outside. A plurality of image forming units 30Y, 30M, 30C, and 30K form the toner images of respective colors of yellow, magenta, cyan, and black.

Figure 2:
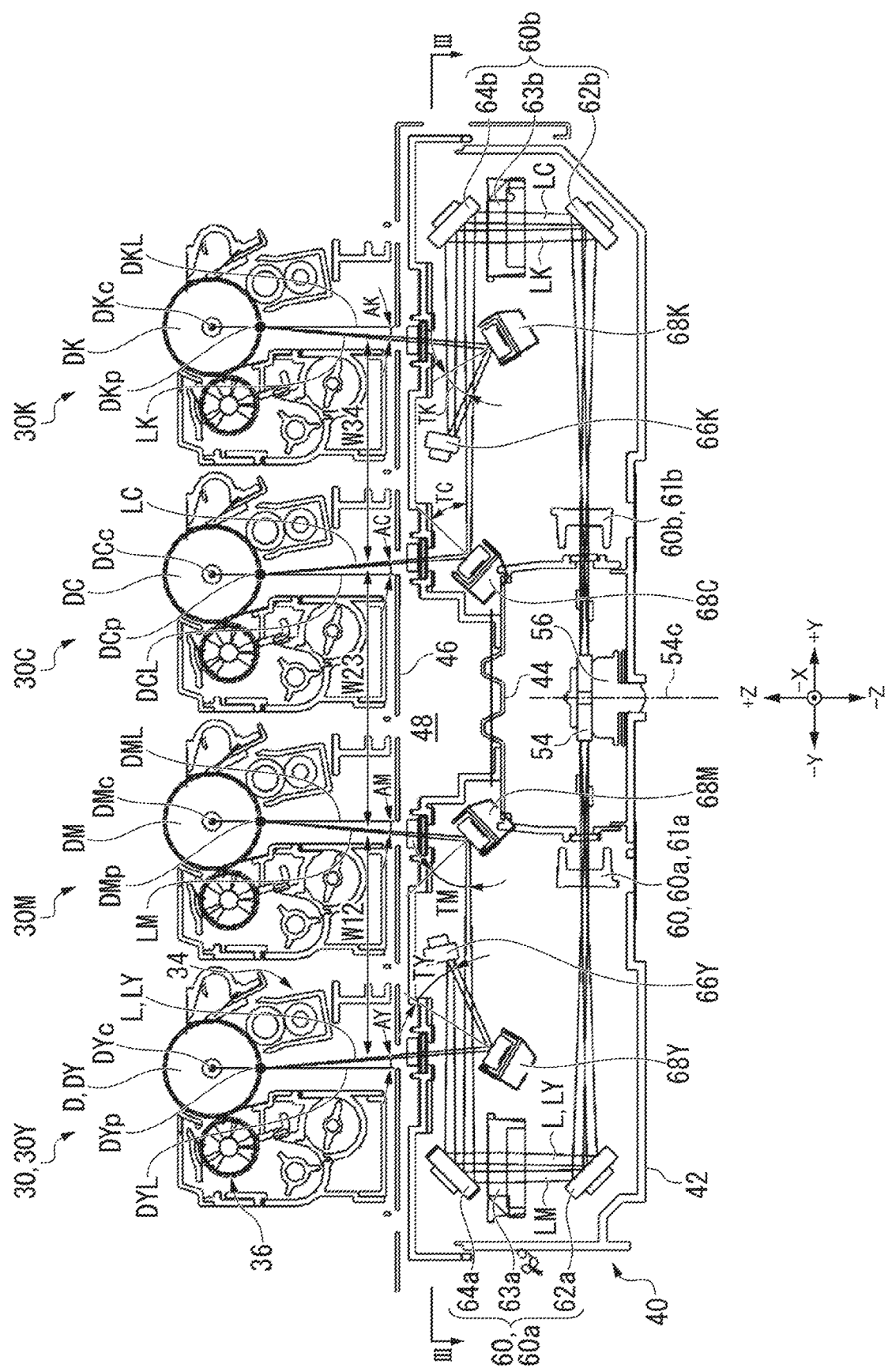
FIG. 2 is a cross-sectional view of a laser scanning unit according to an embodiment from the front side.

FIG. 2 is a diagram describing the laser scanning unit 40 according to an the embodiment. FIG. 2 is a cross-sectional view of the laser scanning unit 40 taken along line II-II of FIG. 3 from the front side.

A charging device 34 and a developing device 36 are disposed in the periphery of the photoconductive drum D. The charging device 34 charges a surface of the photoconductive drum D. The developing device 36 stores a developer which contains toner of a color. The developing device 36 develops an electrostatic latent image with toner on the photoconductive drum D. As a result, the toner image is formed on the photoconductive drum D.

The laser scanning unit 40 is disposed in −Z direction of the photoconductive drum D. The laser scanning unit 40 scans an outer peripheral surface of the charged photoconductive drum D with a laser beam (light flux) L to expose the photoconductive drum D. In other words, the outer peripheral surface of the photoconductive drum D is a scanning target surface. The laser scanning unit 40 forms the electrostatic latent image on the photoconductive drum D. The laser scanning unit 40 will be described below in more detail.

The toner image on the surface of the photoconductive drum D is primarily transferred to the intermediate transfer belt 27.

The transfer unit 28 transfers the toner image primarily transferred on the intermediate transfer belt 27 onto the surface of a sheet S at a secondary transfer position.

The fixing device 29 applies heat and pressure to the sheet S to fix the toner image transferred to the sheet S.

The reverse unit 10 reverses the sheet S to form an image in the opposite surface of the sheet S. The reverse unit 10 reverses the front and rear surfaces of the sheet S discharged from the fixing device 29 by switch-back. The reverse unit 10 conveys the reversed sheet S toward the resist roller 24.

The laser scanning unit 40 will be described below.

As illustrated in FIG. 2, the laser scanning unit 40 scans the photoconductive drum D of the image forming unit 30 with the laser beam L to expose the photoconductive drum D. The laser scanning unit 40 scans the plurality of photoconductive drums DY, DM, DC, and DK with laser beams LY, LM, LC, and LK, respectively. The laser scanning unit 40 includes optical systems for scanning with the laser beams LY, LM, LC, and LK. The optical systems include a first optical system, a second optical system, a third optical system, and a fourth optical system. The first optical system scans the first photoconductive drum DY with the first laser beam LY. The second optical system scans the second photoconductive drum DM with the second laser beam LM. The third optical system scans the third photoconductive drum DC with the third laser beam LC. The fourth optical system scans the fourth photoconductive drum DK with the fourth laser beam LK.

The optical systems are disposed on both sides in Y direction of a polygonal mirror (deflector) 54 in a distributed manner. The first optical system and the second optical system are disposed in −Y direction of the polygonal mirror 54. The third optical system and the fourth optical system are disposed in +Y direction of the polygonal mirror 54. The first optical system and the fourth optical system are disposed symmetrically with respect to an XZ plane which includes a center axis 54c of the polygonal mirror 54. In the following, the first optical system will be representatively described for the first and fourth optical systems. The second optical system and the third optical system are disposed symmetrically to the XZ plane which includes the center axis 54c of the polygonal mirror 54. In the following, the second optical system will be representatively described for the second and third optical systems.

Figure 3:
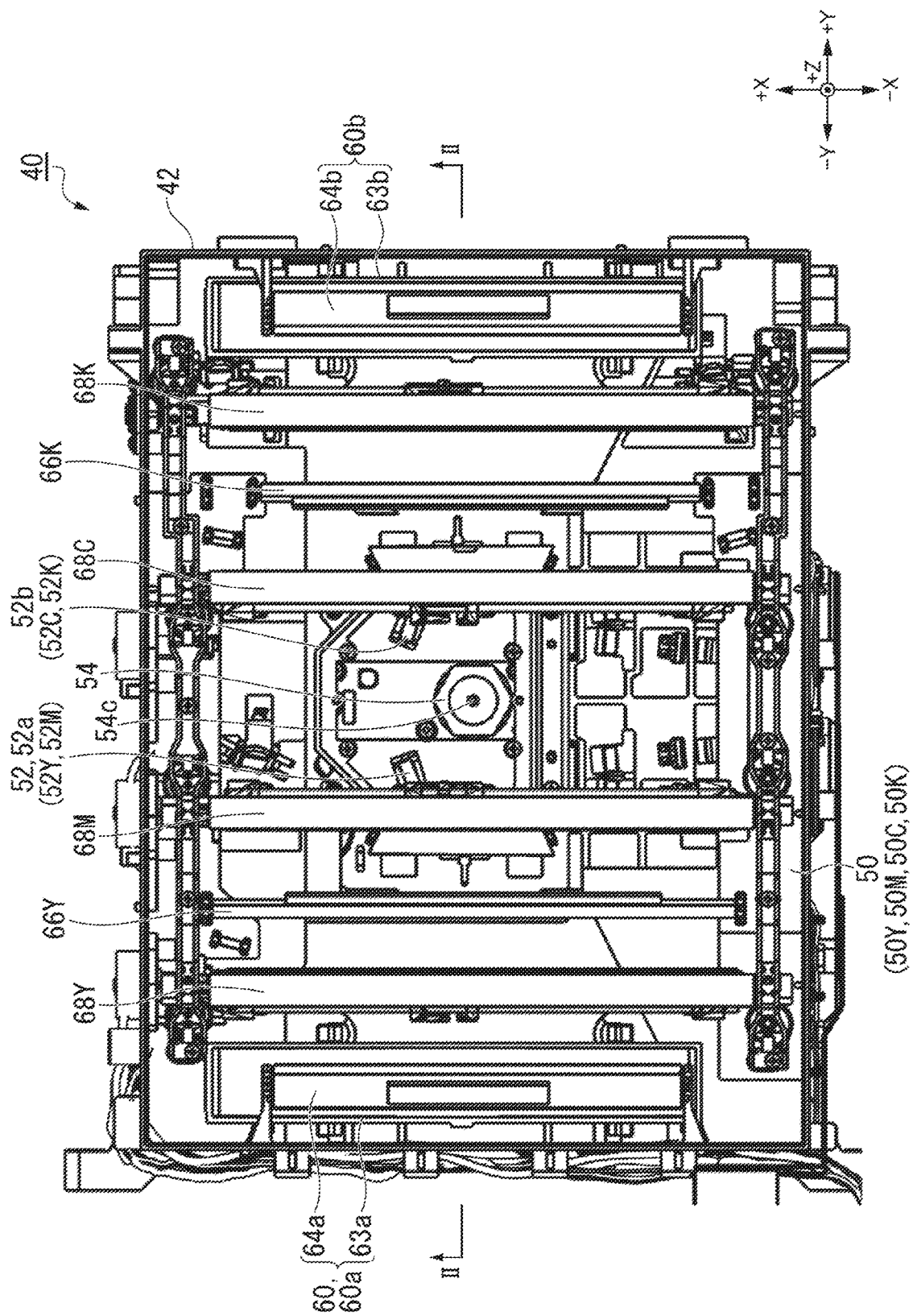
FIG. 3 is a cross-sectional view of the laser scanning unit according to the embodiment from the top side.

The laser scanning unit 40 will be described using FIG. 3. FIG. 3 is a cross-sectional view of the laser scanning unit 40 taken along line III-III of FIG. 2 from the top side.

As illustrated in FIG. 3, the laser scanning unit 40 includes a cover 42, a laser light source 50, and a writing optical system.

The cover 42 encloses components of the laser scanning unit 40.

The laser light source 50 is aligned in −Z direction. The laser light source 50 is disposed in −X direction of the polygonal mirror 54. The optical systems include laser light sources 50Y, 50M, 50C, and 50K. The laser light sources 50Y, 50M, 50C, and 50K emit laser beams LY, LM, LC, and LK, respectively.

The writing optical system includes a collimator lens 52, the polygonal mirror (deflector) 54, a common optical unit 60, and individual optical units. The collimator lens forms at least a part of the pre-deflection optical system. The polygonal mirror 54 deflects laser beam L for scanning the scanning target surface of the photoconductive drum D. The common optical unit 60 and the individual optical units form at least a part of a post-deflection optical system. The post-deflection optical system converges the laser beam L deflected by the polygonal mirror 54 to the scanning target surface of the photoconductive drum D.

The collimator lens 52 reflects the laser beam L emitted from the laser light source 50 toward the polygonal mirror 54. The collimator lens 52 includes a −Y collimator lens 52a and a +Y collimator lens 52b. The −Y collimator lens 52a includes a collimator lens 52Y of the first optical system and a collimator lens 52M of the second optical system. The +Y collimator lens 52b includes a collimator lens 52C of the third optical system and a collimator lens 52K of the fourth optical system.

The polygonal mirror 54 is aligned in −Z direction. The polygonal mirror 54 is disposed at the center portion of the cover 42 in X direction and Y direction. The polygonal mirror 54 is formed in a flat polygon plate shape, and disposed in parallel to the bottom surface of the cover 42. The polygonal mirror 54 is driven by a polygon motor 56 (see FIG. 2), and rotates about the center axis 54c which is parallel to Z direction. Reflecting surfaces are formed on the side surfaces of the polygonal mirror 54. The polygonal mirror 54 reflects the laser beam L entering from the collimator lens 52 toward the common optical unit 60. The polygonal mirror 54 performs scanning of the laser beam L by reflecting the laser beam L while rotating about the center axis 54c. The optical systems share one polygonal mirror 54.

As illustrated in FIG. 2, the common optical unit 60 includes a −Y optical unit (first optical unit) 60a and a +Y optical unit (second optical unit) 60b. The −Y optical unit 60a is shared by the first optical system and the second optical system. The +Y optical unit 60b is shared by the third optical system and the fourth optical system.

The −Y optical unit 60a includes an upstream fθ lens 61a, an upstream reflecting mirror 62a, a downstream fθ lens 63a, and a downstream reflecting mirror 64a.

The upstream reflecting mirror 62a is disposed in −Y direction of the polygonal mirror 54. The upstream reflecting mirror 62a reflects the laser beam L entering in −Y direction from the polygonal mirror 54 toward +Z direction. The downstream reflecting mirror 64a is disposed in −Y direction of the polygonal mirror 54. The downstream reflecting mirror 64a reflects the laser beam L entering in +Z direction from the upstream reflecting mirror 62a in +Y direction. The upstream reflecting mirror 62a and the downstream reflecting mirror 64a are formed in an elongated shape of which a longitudinal direction is aligned to X direction.

The upstream fθ lens 61a is disposed in −Y direction with respect to the polygonal mirror 54. The upstream fθ lens 61a is disposed between the polygonal mirror 54 and the upstream reflecting mirror 62a in Y direction. The downstream fθ lens 63a is disposed in -Y direction. The downstream fθ lens 63a is disposed between the upstream reflecting mirror 62a and the downstream reflecting mirror 64a in Z direction. The upstream fθ lens 61a and the downstream fθ lens 63a are formed in an elongated shape of which a longitudinal direction is aligned to X direction. The upstream fθ lens 61a and the downstream fθ lens 63a form an image by the laser beam L with a predetermined spot diameter in an image plane. The upstream fθ lens 61a and the downstream fθ lens 63a provide an fθ characteristic to the laser beam L such that the image plane is scanned at a constant speed with the laser beam L when the polygonal mirror 54 rotates at a constant speed.

The -Y optical unit 60a directs the first laser beam LY, which enters from the polygonal mirror 54 in -Y direction, in +Y direction such that the first layer beam LY proceeds to a first intermediate reflecting mirror 66Y. The -Y optical unit 60a directs the second laser beam LM, which enters in -Y direction from the polygonal mirror 54, in +Y direction such that the second layer beam LM proceeds to a second final reflecting mirror 68M. The -Y optical unit 60a includes exiting points of the first laser beam LY and the second laser beam LM in +Z direction with respect to incident points of the first laser beam LY and the second laser beam LM.

The +Y optical unit 60b includes an upstream fθ lens 61b, an upstream reflecting mirror 62b, a downstream fθ lens 63b, and the downstream reflecting mirror 64b. The +Y optical unit 60b and the -Y optical unit 60a are formed symmetrically with respect to a XZ plane including the center axis 54c of the polygonal mirror 54.

The +Y optical unit 60b directs the third laser beam LC, which enters from the polygonal mirror 54 in +Y direction, in -Y direction such that the third laser beam LC proceeds to a third final reflecting mirror 68C. The +Y optical unit 60b directs the fourth laser beam LK, which enters from the polygonal mirror 54 in +Y direction, in -Y direction such that the fourth laser beam LK proceeds to a fourth intermediate reflecting mirror 66K.

The first optical system includes the first intermediate reflecting mirror 66Y and a first final reflecting mirror (tilt mirror) 68Y as an individual optical unit.

The first intermediate reflecting mirror 66Y is disposed in +Z direction with respect to the first final reflecting mirror 68Y. The first intermediate reflecting mirror 66Y is disposed in +Y direction of the downstream reflecting mirror 64a of the -Y optical unit 60a. The first intermediate reflecting mirror 66Y is formed in an elongated shape of which a longitudinal direction is aligned to X direction. The first intermediate reflecting mirror 66Y reflects the first laser beam LY, which enters from the downstream reflecting mirror 64a in +Y direction, in -Y direction and -Z direction.

The first final reflecting mirror 68Y is disposed in -Z direction with respect to the downstream reflecting mirror 64a and the first intermediate reflecting mirror 66Y. The first final reflecting mirror 68Y is disposed between the downstream reflecting mirror 64a and the first intermediate reflecting mirror 66Y in Y direction. The first final reflecting mirror 68Y is formed in an elongated shape of which a longitudinal direction is aligned to X direction. The first final reflecting mirror 68Y reflects the first laser beam LY which enters from the first intermediate reflecting mirror 66Y, such that the first laser beam LY enters the first photoconductive drum DY. For example, an incident point DYp of the first laser beam LY on the first photoconductive drum DY is an end portion of the first photoconductive drum DY in -Z direction.

The first final reflecting mirror 68Y causes the first laser beam LY to enter the first photoconductive drum DY in +Z direction and -Y direction. On an YZ plane, a straight line connecting the center DYc of the first photoconductive drum DY and the incident point DYp of the first laser beam LY is referred to as a first straight line DYL. An incidence angle of the first laser beam LY with respect to the first straight line DYL is referred to as a first incidence angle AY. In other words, an angle between the XZ plane containing a center axis of the first photoconductive drum DY and a scanning surface formed by the first laser beam LY incident on the first photoconductive drum DY is the first incidence angle AY. The first final reflecting mirror 68Y causes the first laser beam LY to enter the first photoconductive drum DY at the first incidence angle AY with respect to the first straight line DYL.

The second optical system includes the second final reflecting mirror 68M as an individual optical unit.

The second final reflecting mirror 68M is disposed in +Z direction with respect to the polygonal mirror 54. The second final reflecting mirror 68M is disposed in +Y direction with respect to the first intermediate reflecting mirror 66Y of the first optical system. The second final reflecting mirror 68M is formed in an elongated shape of which a longitudinal direction is aligned to X direction. The second final reflecting mirror 68M reflects the second laser beam LM which enters from the downstream reflecting mirror 64a of the -Y optical unit 60a in +Y direction, and causes the second laser beam LM to proceed to the second photoconductive drum DM. For example, an incident point DMp of the second laser beam LM on the second photoconductive drum DM is an end portion of the second photoconductive drum DM in -Z direction.

The second final reflecting mirror 68M causes the second laser beam LM to enter the second photoconductive drum DM in +Z direction and +Y direction. On a YZ plane, a straight line connecting a center DMc of the second photoconductive drum DM and the incident point DMp of the second laser beam LM is referred to as a second straight line DML. An incidence angle of the second laser beam LM with respect to the second straight line DML is referred to as a second incidence angle AM. In other words, an angle between an XZ plane containing a center axis of the second photoconductive drum DM and a scanning surface formed by the second laser beam LM incident on the second photoconductive drum DM is the second incidence angle AM. The second final reflecting mirror 68M causes the second laser beam LM to enter the second photoconductive drum DM at the second incidence angle AM with respect to the second straight line DML.

The third optical system includes the third final reflecting mirror 68C as an individual optical unit. The third optical system and the second optical system are formed symmetrically with respect to a XZ plane including the center axis 54c of the polygonal mirror 54.

The third final reflecting mirror 68C causes the third laser beam LC to enter the third photoconductive drum DC in +Z direction and -Y direction. On a YZ plane, a straight line connecting a center DCc of the third photoconductive drum DC and an incident point DCp of the third laser beam LC is referred to as a third straight line DCL. An incidence angle of the third laser beam LC with respect to the third straight line DCL is referred to as a third incidence angle AC. In other words, an angle between an XZ plane containing a center axis of the third photoconductive drum DC and a scanning surface formed by the third laser beam LC incident on the third photoconductive drum DC is the third incidence angle AC. The third final reflecting mirror 68C causes the third laser beam LC to enter the third photoconductive drum DC at the third incidence angle AC with respect to the third straight line DCL.

The fourth optical system includes the fourth intermediate reflecting mirror 66K and a fourth final reflecting mirror 68K as an individual optical unit. The fourth optical system and the first optical system are formed symmetrically with respect to an XZ plane including the center axis 54c of the polygonal mirror 54.

The fourth final reflecting mirror 68K causes the fourth laser beam LK to enter the fourth photoconductive drum DK in +Z direction and +Y direction. On a YZ plane, a straight line connecting the center DKc of the fourth photoconductive drum DK and an incident point DKp of the fourth laser beam LK is referred to as a fourth straight line DKL. An incidence angle of the fourth laser beam LK with respect to the fourth straight line DKL is referred to as a fourth incidence angle AK. In other words, an angle between an XZ plane containing a center axis of the fourth photoconductive drum DK and a scanning surface formed by the fourth laser beam LK incident on the fourth photoconductive drum DK is the fourth incidence angle AK. The fourth final reflecting mirror 68K causes the fourth laser beam LK to enter the fourth photoconductive drum DK at the fourth incidence angle AK with respect to the fourth straight line DKL.

The plurality of photoconductive drums DY, DM, DC, and DK include a left photoconductive drum (a photoconductive drum on one side) and a right photoconductive drum (a photoconductive drum on the other side) which are adjacently disposed on the left and right sides. The expression "adjacently disposed on the left and right sides" includes a case where the photoconductive drums are adjacent not only in a horizontal direction but also in arbitrary directions such as a vertical direction. A left straight line (a straight line on one side) is defined as a line connecting the center of the left photoconductive drum and the incident point to the left photoconductive drum of the left laser beam (a laser beam on one side) which exposes the left photoconductive drum. The laser scanning unit 40 causes the left laser beam to enter the left photoconductive drum at the left incidence angle (an incidence angle on one side) with respect to the left straight line. A right straight line (a straight line on the other side) is defined as a line connecting the center of the right photoconductive drum and the incident point to the right photoconductive drum of the right laser beam (a laser beam on the other side) which exposes the right photoconductive drum. The laser scanning unit 40 causes the right laser beam to enter the right photoconductive drum at the right incidence angle (an incidence angle on the other side) of the same magnitude as the left incidence angle but reversed in direction with respect to the right straight line.

The "same magnitude" of the incidence angle may allow for a case where there is an applicable error in manufacturing.

For example, the left photoconductive drum is the first photoconductive drum DY, and the right photoconductive drum is the second photoconductive drum DM. The laser scanning unit 40 causes the first laser beam LY to enter the first photoconductive drum DY at the first incidence angle AY. The laser scanning unit 40 causes the second laser beam LM to enter the second photoconductive drum DM at the second incidence angle AM. The second incidence angle AM has the same magnitude as the first incidence angle AY but reversed in direction. On a YZ plane, a distance W12 in Y direction between the first laser beam LY entering the first photoconductive drum DY and the second laser beam LM entering the second photoconductive drum DM increases along +Z direction. In other words, a distance in Y direction between the scanning surface formed by the first laser beam LY incident on the first photoconductive drum DY and the scanning surface formed by the second laser beam LM incident on the second photoconductive drum DM increases along +Z direction.

For example, the left photoconductive drum is the second photoconductive drum DM, and the right photoconductive drum is the third photoconductive drum DC. The laser scanning unit 40 causes the second laser beam LM to enter the second photoconductive drum DM at the second incidence angle AM. The laser scanning unit 40 causes the third laser beam LC to enter the third photoconductive drum DC at the third incidence angle AC. The third incidence angle AC has the same magnitude as the second incidence angle AM but reversed in direction. In other words, the third incidence angle AC is equal to the first incidence angle AY. On a YZ plane, a distance W23 in Y direction between the second laser beam LM entering the second photoconductive drum DM and the third laser beam LC entering the third photoconductive drum DC decreases along +Z direction. In other words, a distance in Y direction between the scanning surface formed by the second laser beam LM incident on the second photoconductive drum DM and the scanning surface formed by the third laser beam LC incident on the third photoconductive drum DC decreases along +Z direction.

For example, the left photoconductive drum is the third photoconductive drum DC, and the right photoconductive drum is the fourth photoconductive drum DK. The laser scanning unit 40 causes the third laser beam LC to enter the third photoconductive drum DC at the third incidence angle AC. The laser scanning unit 40 causes the fourth laser beam LK to enter the fourth photoconductive drum DK at the fourth incidence angle AK. The fourth incidence angle AK has the same magnitude as the third incidence angle AC but reversed in direction. In other words, the fourth incidence angle AK is equal to the second incidence angle AM. On a YZ plane, a distance in Y direction between the third laser beam LC entering the third photoconductive drum DC and the fourth laser beam LK entering the fourth photoconductive drum DK increases along +Z direction. In other words, a distance in Y direction between the scanning surface formed by the third laser beam LC incident on the third photoconductive drum DC and the scanning surface formed by the fourth laser beam LK incident on the fourth photoconductive drum DK increases along +Z direction.

The magnitudes of the first incidence angle AY and the second incidence angle AM are equal. Thus, the optical characteristics of the respective optical systems become equal. The magnitudes of the first incidence angle AY and the second incidence angle AM are larger than zero. Thus, interference fringes by the incident laser beam L is prevented from occurring even if the photoconductive layer at the surface of the photoconductive drum D is formed in a multilayer structure.

A center of a reflecting surface of the first final reflecting mirror 68Y in the width direction is disposed in +Y direction with respect to the center DYc of the first photoconductive drum DY. A center of a reflecting surface of the fourth final reflecting mirror 68K in the width direction is disposed in −Y direction with respect to the center DKc of the fourth photoconductive drum DK. Thus, the laser scanning unit 40 can be formed compactly in Y direction.

As illustrated in FIG. 2, a duct 48 is formed in +Z direction of the polygonal mirror 54, and extends in X direction. Peripheral walls of the duct 48 are formed by the cover 42 of the laser scanning unit 40, a plate 44, and a housing 46 of the image forming apparatus 1. Air flowing inside the duct 48 cools down the polygon motor 56 through the plate 44.

A center in the width direction of a reflecting surface of the second final reflecting mirror 68M is disposed in −Y direction with respect to the center DMc of the second photoconductive drum DM. A center of a reflecting surface of the third final reflecting mirror 68C in the width direction is disposed in +Y direction with respect to the center DCc of the third photoconductive drum DC. As a result, the cross-sectional area of a flow passage of the duct 48 becomes wider. Therefore, a cooling efficiency of the polygon motor 56 is improved.

Figure 4:
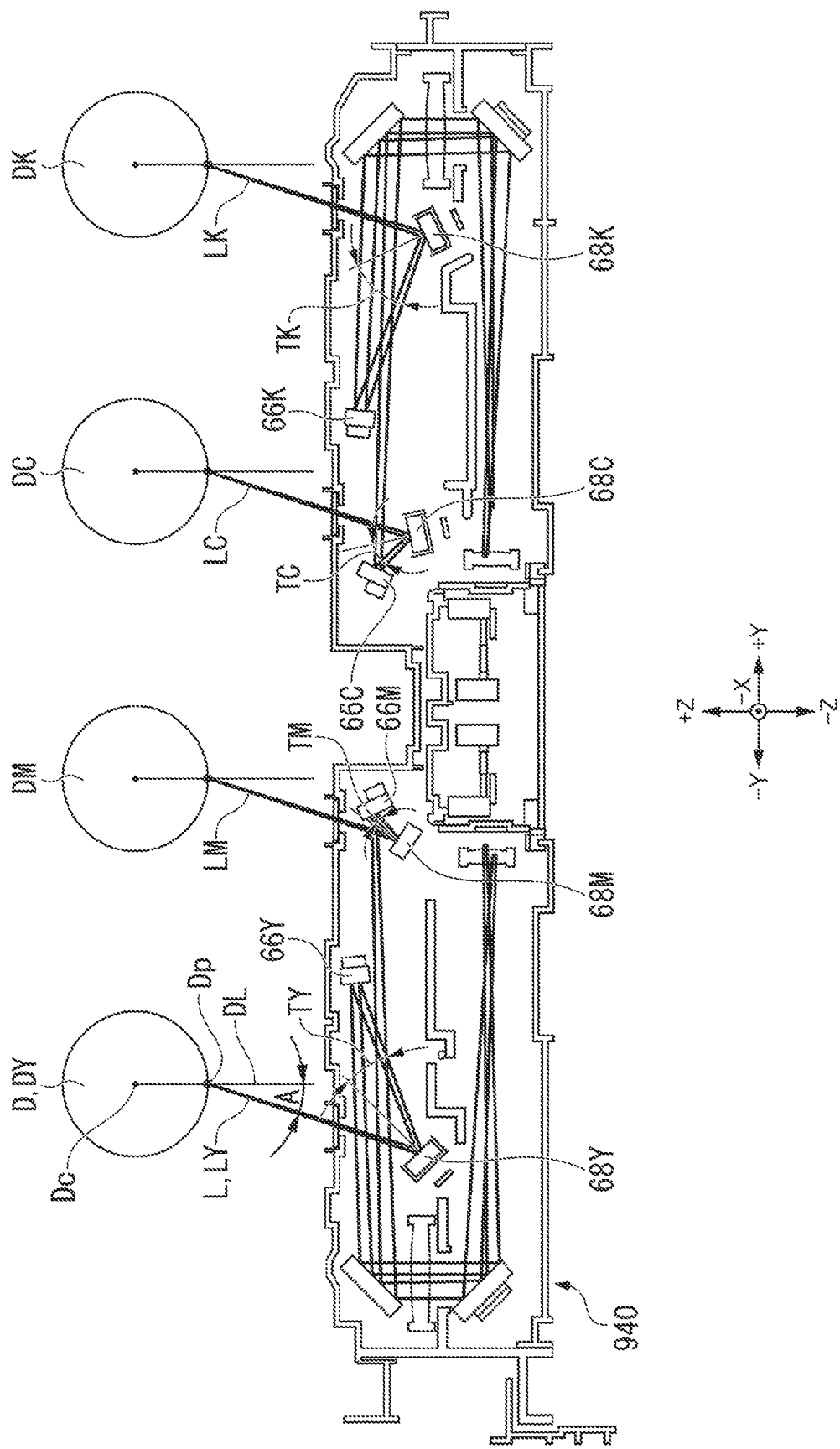
FIG. 4 is a cross-sectional view of a laser scanning unit of a comparative example from the front side.

FIG. 4 is a cross-sectional view of a laser scanning unit 940 of a comparative example from the front side. The laser scanning unit 940 causes the laser beam L to enter the photoconductive drum D. A straight line connecting the center Dc of the photoconductive drum D and an incident point Dp of the laser beam L is referred to as a straight line DL. An incidence angle of the laser beam L with respect to the straight line DL is referred to as an incidence angle A. The laser scanning unit 940 causes the laser beam L to enter the respective photoconductive drums DY, DM, DC, and DK at an incidence angle of the same magnitude and direction as the incidence angle A. The laser scanning unit 940 includes a second intermediate reflecting mirror 66M and a third intermediate reflecting mirror 66C.

In the laser scanning unit 940 of the comparative example, the scanning surfaces formed by the laser beam L incident on the respective photoconductive drums DY, DM, DC, and DK are parallel to each other. An optical path length in the laser scanning unit 40 of the embodiment illustrated in FIG. 2 becomes shorter compared to the laser scanning unit 940. Thus, the laser scanning unit 40 becomes more compact.

As illustrated in FIG. 4, an incidence angle of the first laser beam LY with respect to the first final reflecting mirror 68Y of the first optical system is a first final incidence angle TY. An incidence angle of the second laser beam LM with respect to the second final reflecting mirror 68M of the second optical system is a second final incidence angle TM. An incidence angle of the third laser beam LC with respect to the third final reflecting mirror 68C of the third optical system is a third final incidence angle TC. An incidence angle of the fourth laser beam LK with respect to the fourth final reflecting mirror 68K of the fourth optical system is a fourth final incidence angle TK.

In the laser scanning unit 940 of the comparative example, the final incidence angles TY, TM, TC, and TK of the respective optical systems are different in magnitude from each other. The magnitude of the second final incidence angle TM is smallest, and the magnitude of the fourth final incidence angle TK is largest. In the laser scanning unit 940, a magnitude difference is larger among the final incidence angles TY, TM, TC, and TK of the respective optical systems.

In contrast, in the laser scanning unit 40 of the embodiment illustrated in FIG. 2, the magnitudes of the first final incidence angle TY and the fourth final incidence angle TK are equal. The magnitudes of the second final incidence angle TM and the third final incidence angle TC are equal. A difference is smaller between the magnitude of the first final incidence angle TY and the magnitude of the second final incidence angle TM. In other words, in the laser scanning unit 40, a difference is smaller among the final incidence angles TY, TM, TC, and TK of the respective optical systems. For that reason, the optical characteristics of the respective optical systems can become substantially equal. Specifically, the scanning distances in the main scanning direction of the respective photoconductive drums DY, DM, DC, and DK can become substantially equal. In other words, a sensitivity of a tilt amount when a tilt is adjusted by overlapping the colors in the respective optical systems can become substantially equal.

As described above, the image forming apparatus 1 of the embodiment includes the plurality of photoconductive drums DY, DM, DC, and DK and the laser scanning unit 40. The plurality of photoconductive drums DY, DM, DC, and DK include the left photoconductive drum (a photoconductive drum on one side) and the right photoconductive drum (a photoconductive drum on the other side) which are adjacently disposed.

Here, a left straight line (a straight line on one side) is defined as a line connecting the incident point on the left photoconductive drum of the left laser beam (a laser beam on one side) which exposes the left photoconductive drum and the center of the left photoconductive drum. The laser scanning unit 40 causes the left laser beam to enter the left photoconductive drum at the left incidence angle (an incidence angle on one side) with respect to the left straight line.

Here, a right straight line (a straight line on the other side) is defined as a line connecting the incident point on the right photoconductive drum of the right laser beam (a laser beam on the other side) which exposes the right photoconductive drum and the center of the right photoconductive drum. The laser scanning unit 40 causes the right laser beam to enter the right photoconductive drum at the right incidence angle (an incidence angle on the other side) of the same magnitude as the left incidence angle but reversed in direction with respect to the right straight line.

As a result, the laser scanning unit 40 can be formed in a compact manner, and so can the image forming apparatus 1. Since the magnitudes of the left incidence angle and the right incidence angle are equal, the optical characteristics of the respective optical systems are substantially equal.

The incident point to the left photoconductive drum of the left laser beam is an end portion of the left photoconductive drum on a side near the laser scanning unit 40. The incident point to the right photoconductive drum of the right laser beam is an end portion of the right photoconductive drum on a side near the laser scanning unit 40.

According to an embodiment, the incident points of the respective laser beams on the respective photoconductive drums are substantially equal, so that the optical characteristics of the respective optical systems are substantially equal.

The plurality of photoconductive drums DY, DM, DC, and DK include the first photoconductive drum DY, the second photoconductive drum DM, the third photoconductive drum DC, and the fourth photoconductive drum DK which are aligned in +Y direction.

The first straight line DYL is a line connecting the center DYc of the first photoconductive drum DY and the incident point DYp on the first photoconductive drum DY of the first laser beam LY exposing the first photoconductive drum DY. The laser scanning unit 40 causes the first laser beam LY to enter the first photoconductive drum DY at the first incidence angle AY with respect to the first straight line DYL.

The second straight line DML is a line connecting the center DMc of the second photoconductive drum DM and the incident point DMp on the second photoconductive drum DM of the second laser beam LM exposing the second photoconductive drum DM. The laser scanning unit 40 causes the second laser beam LM to enter the second photoconductive drum DM at the second incidence angle AM of the same magnitude as the first incidence angle AY but reversed in direction with respect to the second straight line DML.

The third straight line DCL is a line connecting the center DCc of the third photoconductive drum DC and the incident point DCp on the third photoconductive drum DC of the third laser beam LC exposing the third photoconductive drum DC. The laser scanning unit 40 causes the third laser beam LC to enter the third photoconductive drum DC at the first incidence angle AY with respect to the third straight line DCL.

The fourth straight line DKL is a line connecting the incident point DKp on the fourth photoconductive drum DK of the fourth laser beam LK exposing the fourth photoconductive drum DK and the center DKc of the fourth photoconductive drum DK. The laser scanning unit 40 causes the fourth laser beam LK to enter the fourth photoconductive drum DK at the second incidence angle AM with respect to the fourth straight line DKL.

According such a configuration, the laser scanning unit 40 can be formed in a compact manner. Since the magnitudes of the first incidence angle AY and the second incidence angle AM are equal, the optical characteristics of the respective optical system can be substantially equal.

The laser scanning unit 40 includes the polygonal mirror 54 which reflects the first laser beam LY, the second laser beam LM, the third laser beam LC, and the fourth laser beam LK for scanning. The first photoconductive drum DY and the second photoconductive drum DM are disposed in −Y direction of the polygonal mirror 54. The third photoconductive drum DC and the fourth photoconductive drum DK are disposed in +Y direction of the polygonal mirror 54.

According to such a configuration, the respective optical systems are disposed symmetrically to each other with respect to the polygonal mirror 54 interposed therebetween. Thus, the optical path lengths of the respective optical systems can be substantially equal, and the optical characteristics can be substantially equal.

Here, a distance W12 is defined as a distance in +Y direction between the first laser beam LY entering the first photoconductive drum DY and the second laser beam LM entering the second photoconductive drum DM. The laser scanning unit 40 directs the first laser beam LY and the second laser beam LM such that the distance W12 becomes larger along +Z direction. +Z direction is a direction heading from the laser scanning unit 40 to the plurality of photoconductive drums DY, DM, DC, and DK.

Here, a distance W23 is defined as a distance in +Y direction between the second laser beam LM entering the second photoconductive drum DM and the third laser beam LC entering the third photoconductive drum DC. The laser scanning unit 40 directs the second laser beam LM and the third laser beam LC such that the distance W23 becomes smaller along +Z direction.

Here, a distance W34 is defined as a distance in +Y direction between the third laser beam LC entering the third photoconductive drum DC and the fourth laser beam LK entering the fourth photoconductive drum DK. The laser scanning unit 40 directs the third laser beam LC and the fourth laser beam LK such that the distance W34 becomes larger along +Z direction.

According to such a configuration, the laser scanning unit 40 can be formed in a compact manner in Y direction, and so can the image forming apparatus 1.

The duct 48 is disposed in +Z direction of the polygonal mirror 54 to circulate the air.

According to such a configuration, the duct 48 is formed in a place where the distance W23 is relatively larger. Thus, the cross-sectional area of the flow passage of the duct 48 becomes relatively larger.

The laser scanning unit 40 includes the first intermediate reflecting mirror 66Y, the first final reflecting mirror 68Y, the second final reflecting mirror 68M, the third final reflecting mirror 68C, the fourth intermediate reflecting mirror 66K, and the fourth final reflecting mirror 68K.

The first intermediate reflecting mirror 66Y reflects the first laser beam LY entering in +Y direction to −Y direction. The first final reflecting mirror 68Y reflects the first laser beam LY which enters from the first intermediate reflecting mirror 66Y, and causes the first laser beam LY to enter the first photoconductive drum DY.

The second final reflecting mirror 68M reflects the second laser beam LM entering in +Y direction and causes the second laser beam LM to enter the second photoconductive drum DM.

The third final reflecting mirror 68C reflects the third laser beam LC entering in −Y direction and causes the third laser beam LC to enter the third photoconductive drum DC.

The fourth intermediate reflecting mirror 66K reflects the fourth laser beam LK entering in −Y direction to +Y direction. The fourth final reflecting mirror 68K reflects the fourth laser beam LK entering from the fourth intermediate reflecting mirror 66K and causes the fourth laser beam LK to enter the fourth photoconductive drum DK.

According to such a configuration, the first optical system includes the first intermediate reflecting mirror 66Y, so that the optical path lengths of the first optical system and the second optical system are substantially equal. The fourth optical system includes the fourth intermediate reflecting mirror 66K, so that the optical path lengths of the third optical system and the fourth optical system are substantially equal. As a result, the optical characteristics of the respective optical systems can be substantially equal.

The first intermediate reflecting mirror 66Y reflects the first laser beam LY in −Z direction opposite to +Z direction. The fourth intermediate reflecting mirror 66K reflects the fourth laser beam LK in −Z direction.

According to such a configuration, optical interference can be avoided between the first laser beam LY entering the first intermediate reflecting mirror 66Y and the first final reflecting mirror 68Y. Also, optical interference can be avoided between fourth laser beam LK entering the fourth intermediate reflecting mirror 66K and the fourth final reflecting mirror 68K. The laser scanning unit 40 can become compact in Z direction, and so can the image forming apparatus 1.

The laser scanning unit includes the −Y optical unit 60*a* and the +Y optical unit 60*b*.

The −Y optical unit 60*a* directs the first laser beam LY, which enters from the polygonal mirror 54 in −Y direction, in +Y direction such that the first laser beam LY proceeds to the first intermediate reflecting mirror 66Y. The −Y optical unit 60*a* directs the second laser beam LM, which enters in −Y direction from the polygonal mirror 54, in +Y direction such that the second laser beam LM proceeds to the second final reflecting mirror 68M.

The +Y optical unit 60b directs the third laser beam LC, which enters from the polygonal mirror 54 in +Y direction, in −Y direction such that the third laser beam LC proceeds to the third final reflecting mirror 68C. The +Y optical unit 60b directs the fourth laser beam LK, which enters in +Y direction from the polygonal mirror 54, in −Y direction such that the fourth laser beam LK proceeds to the fourth intermediate reflecting mirror 66K.

According to such a configuration, the first optical system and the second optical system share the −Y optical unit 60a. The third optical system and the fourth optical system share the +Y optical unit 60b. Thus, the optical path lengths of the respective optical systems can be substantially equal, and therefore the optical characteristics can be substantially equal.

The −Y optical unit 60a includes exiting points of the first laser beam LY and the second laser beam LM in +Z direction with respect to incident points of the first laser beam LY and the second laser beam LM.

The +Y optical unit 60b includes exiting points of the third laser beam LC and the fourth laser beam LK in +Z direction with respect to incident points of the third laser beam LC and the fourth laser beam LK.

According to such a configuration, laser beams of the respective optical systems are reflected in +Z direction. Thus, the laser scanning unit 40 can become compact in Y direction, and so can the image forming apparatus 1.

The image forming apparatus 1 according to an embodiment includes the plurality of photoconductive drums DY, DM, DC, and DK arranged in +Z direction of the laser scanning unit. The intermediate transfer belt 27 is aligned in +Z direction along the plurality of photoconductive drums DY, DM, DC, and DK. Alternatively, the image forming apparatus may include the plurality of photoconductive drums DY, DM, DC, and DK in −Z direction of the laser scanning unit. In this case, the intermediate transfer belt 27 may be provided in −Z direction along the plurality of photoconductive drums DY, DM, DC, and DK.

The image forming apparatus 1 according to an embodiment includes four optical systems, the first to fourth optical systems. The image forming apparatus may include four or more optical systems.

In the image forming apparatus 1 according to an embodiment, the incident point of the laser beam L on the photoconductive drum D is an end portion of the photoconductive drum D in −Z direction. The incident point to the photoconductive drum D of the laser beam L may be a position other than an end portion of the photoconductive drum D in −Z direction.

According to at least one of the embodiments described above, the laser scanning unit 40 is provided. The laser scanning unit 40 causes a left light beam and a right light beam to enter the left photoconductive drum and the right photoconductive drum, respectively, which are adjacently disposed on the right and left sides, respectively. The left incidence angle and the right incidence angle have the same magnitude but reversed in direction. Thus, it is possible to make the image forming apparatus 1 compact.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus comprising:
a first photoconductive drum;
a second photoconductive drum having a center aligned with a center of the first photoconductive drum along a first direction; and
a laser scanning unit including a plurality of optical elements configured to:
direct a first scanning beam to the first photoconductive drum from a first side of, and at a first incidence angle with respect to, a first line passing through the center of the first photoconductive drum and a first incidence position of the first scanning beam on the first photoconductive drum in a second direction crossing the first direction; and
direct a second scanning beam to the second photoconductive drum from a second side of, and at a second incidence angle with respect to, a second line passing through the center of the second photoconductive drum and a second incidence position of the second scanning beam on the second photoconductive drum in the second direction,
wherein magnitudes of the first incidence angle and the second incidence angle are substantially the same,
wherein a second side of the first line, which is opposite to the first side of the first line, and a first side of the second line, which is opposite to the second side of the second line, are each between the first side of the first line and the second side of the second line, and
wherein the plurality of optical elements include first, second, third, and fourth mirrors, wherein
the first mirror is positioned to direct the first scanning beam to the second mirror and the second scanning beam to the third mirror,
the second mirror is positioned to direct the first scanning beam from the first mirror to the fourth mirror,
the third mirror is positioned to direct the second scanning beam from the first mirror to the second photoconductive drum, and
the fourth mirror is positioned to direct the first scanning beam from the second mirror to the first photoconductive drum.

2. The image forming apparatus according to claim 1, wherein the first and second photoconductive drums are disposed adjacent to each other.

3. The image forming apparatus according to claim 1, wherein the laser scanning unit includes a polygonal mirror configured to direct the first and second laser beams to the plurality of optical elements, and the first and second photoconductive drums are disposed on the same side with respect to the polygonal mirror.

4. The image forming apparatus according to claim 1, wherein the plurality of optical elements are configured to cause a distance between the first scanning beam directed to the first photoconductive drum and the second scanning beam directed to the second photoconductive drum to become longer as the first and second scanning beams approach the first and second photoconductive drums, respectively.

5. The image forming apparatus according to claim 1, further comprising:

a third photoconductive drum; and
a fourth photoconductive drum, wherein
the laser scanning unit further includes a second plurality of optical elements configured to:
direct a third scanning beam to the third photoconductive drum from a first side of, and at a third incidence angle with respect to, a third line passing through a center of the third photoconductive drum and a third incidence position of the third scanning beam on the third photoconductive drum; and
direct a fourth scanning beam to the fourth photoconductive drum from a second side of, and at a fourth incidence angle with respect to, a fourth line passing through a center of the fourth photoconductive drum and a fourth incidence position of the fourth scanning beam on the fourth photoconductive drum,
wherein magnitudes of the third incidence angle and the fourth incidence angle are substantially the same, and
wherein a second side of the third line, which is opposite to the first side of the third line, and a first side of the fourth line, which is opposite to the second side of the fourth line, are each between the first side of the third line and the second side of the fourth line.

6. The image forming apparatus according to claim 5, wherein the centers of the first, second, third, and fourth photoconductive drums are arranged in this order and aligned along the first direction.

7. The image forming apparatus according to claim 5, wherein the laser scanning unit includes a polygonal mirror configured to direct the first and second laser beams to the plurality of optical elements, and direct the third and fourth laser beams to the second plurality of optical elements,
the first and fourth photoconductive drums are disposed symmetrically with respect to the polygonal mirror, and
the second and third photoconductive drums are disposed symmetrically with respect to the polygonal mirror.

8. The image forming apparatus according to claim 7, wherein the plurality of optical elements and the second plurality of optical elements are disposed symmetrically with respect to the polygonal mirror.

9. The image forming apparatus according to claim 7, wherein
the second plurality of optical elements include a fifth mirror positioned to direct the third laser beam to the third photoconductive drum and a sixth mirror positioned to direct the fourth laser beam to the fourth photoconductive drum,
an incidence angle of the first laser beam on the fourth mirror is equal to an incidence angle of the fourth laser beam on the sixth mirror, and an incidence angle of the second laser beam on the third mirror is equal to an incidence angle of the third laser beam on the fifth mirror.

10. The image forming apparatus according to claim 7, further comprising a duct formed adjacent to the polygonal mirror between the plurality of optical elements and the second plurality of optical elements.

11. The image forming apparatus according to claim 7, wherein
the first photoconductive drum is configured to form a yellow toner image,
the second photoconductive drum is configured to form a magenta toner image,
the third photoconductive drum is configured to form a cyan toner image, and
the fourth photoconductive drum is configured to form a black toner image.

12. An image forming method using an image forming apparatus including a first photoconductive drum, a second photoconductive drum, and a plurality of optical elements including first, second, third, and fourth mirrors, the method comprising:
directing, using the plurality of optical elements, a first scanning beam to the first photoconductive drum from a first side of, and at a first incidence angle with respect to, a first line passing through a center of the first photoconductive drum and a first incidence position of the first scanning beam on the first photoconductive drum; and
directing, using the plurality of optical elements, a second scanning beam to the second photoconductive drum from a second side of, and at a second incidence angle with respect to, a second line passing through a center of the second photoconductive drum and a second incidence position of the second scanning beam on the second photoconductive drum,
wherein magnitudes of the first incidence angle and the second incidence angle are substantially the same,
wherein a second side of the first line, which is opposite to the first side of the first line, and a first side of the second line, which is opposite to the second side of the second line, are each between the first side of the first line and the second side of the second line;
wherein the first mirror is positioned to direct the first scanning beam to the second mirror and the second scanning beam to the third mirror,
wherein the second mirror is positioned to direct the first scanning beam from the first mirror to the fourth mirror,
wherein the third mirror is positioned to direct the second scanning beam from the first mirror to the second photoconductive drum, and
wherein the fourth mirror is positioned to direct the first scanning beam from the second mirror to the first photoconductive drum.

13. The image forming method according to claim 12, wherein the first and second photoconductive drums are disposed adjacent to each other.

14. The image forming method according to claim 12, wherein the image forming apparatus includes a polygonal mirror, and the first and second photoconductive drums are disposed on the same side with respect to the polygonal mirror.

15. The image forming method according to claim 12, wherein the image forming apparatus further includes a third photoconductive drum and a fourth photoconductive drum, the method further comprising:
directing a third scanning beam to the third photoconductive drum from a first side of, and at a third incidence angle with respect to, a third line passing through a center of the third photoconductive drum and a third incidence position of the third scanning beam on the third photoconductive drum; and
directing a fourth scanning beam to the fourth photoconductive drum from a second side of, and at a fourth incidence angle with respect to, a fourth line passing through a center of the fourth photoconductive drum and a fourth incidence position of the fourth scanning beam on the fourth photoconductive drum,
wherein magnitudes of the third incidence angle and the fourth incidence angle are substantially the same, and
wherein a second side of the third line, which is opposite to the first side of the third line, and a first side of the fourth line, which is opposite to the second side of the fourth line, are each between the first side of the third line and the second side of the fourth line.

16. The image forming method according to claim 15, wherein the centers of the first, second, third, and fourth photoconductive drums are arranged in this order and aligned along a first direction.

17. The image forming method according to claim 15, wherein the image forming apparatus includes a polygonal mirror, the first and fourth photoconductive drums are disposed symmetrically with respect to the polygonal mirror, and the second and third photoconductive drums are disposed symmetrically with respect to the polygonal mirror.

\* \* \* \* \*